United States Patent
Thirasuttakorn et al.

(10) Patent No.: US 11,349,981 B1
(45) Date of Patent: May 31, 2022

(54) METHODS FOR OPTIMIZING MULTIMEDIA COMMUNICATION AND DEVICES THEREOF

(71) Applicant: F5 Networks, Inc., Seattle, WA (US)

(72) Inventors: Nat Thirasuttakorn, Bangkok (TH); Daniel Wright, Seattle, WA (US)

(73) Assignee: F5, Inc., Seattle, WA (US)

( * ) Notice: Subject to any disclaimer, the term of this patent is extended or adjusted under 35 U.S.C. 154(b) by 33 days.

(21) Appl. No.: 17/084,064

(22) Filed: Oct. 29, 2020

Related U.S. Application Data

(60) Provisional application No. 62/928,049, filed on Oct. 30, 2019.

(51) Int. Cl.
- *H04M 3/02* (2006.01)
- *H04L 65/60* (2022.01)
- *H04W 76/12* (2018.01)

(52) U.S. Cl.
CPC ............ *H04M 3/02* (2013.01); *H04L 65/601* (2013.01); *H04W 76/12* (2018.02)

(58) Field of Classification Search
CPC ........ H04M 3/02; H04L 65/601; H04W 76/12
See application file for complete search history.

(56) References Cited

U.S. PATENT DOCUMENTS

| | | | |
|---|---|---|---|
| 4,783,828 A | 11/1988 | Sadjadi | |
| 5,537,488 A | 7/1996 | Menon et al. | |
| 6,118,893 A | 9/2000 | Li | |
| 6,314,408 B1 | 11/2001 | Salas et al. | |
| 6,597,702 B1 * | 7/2003 | Caugherty | H04L 29/06 370/410 |
| 6,597,777 B1 | 7/2003 | Ho | |
| 6,748,056 B1 | 6/2004 | Capriotti et al. | |
| 6,769,066 B1 | 7/2004 | Botros et al. | |

(Continued)

FOREIGN PATENT DOCUMENTS

| | | |
|---|---|---|
| WO | 2010/043722 A1 | 4/2010 |
| WO | 2017/016454 A1 | 2/2017 |

OTHER PUBLICATIONS

"BIG-IP® Analytics: Implementations," Version 11.3, Publication No. MAN-0357-03, F5 Networks, Inc., pp. 1-40, Nov. 15, 2012.

(Continued)

*Primary Examiner* — Brenda H Pham
(74) *Attorney, Agent, or Firm* — Troutman Pepper Hamilton Sanders LLP (Rochester)

(57) ABSTRACT

The technology discloses intercepting a request to initiate a call configured to utilize one of plurality of call initiation techniques. Next, it is determined when the one of the call initiation techniques in the intercepted request is in a subset of the plurality of call initiation techniques configured to integrate at least a part of media control negotiation and call establishment. One or more fields of the intercepted request is modified to disable the one of the plurality of call initiation techniques that is configured to integrate at least a part of media control negotiation and call establishment when the determination indicates the one of the plurality of call initiation techniques is in the subset. A permission is provided to the first mobile device to initiate the call with the second mobile device using a sequential call establishment and media control negotiation technique.

20 Claims, 12 Drawing Sheets

(56) References Cited

U.S. PATENT DOCUMENTS

| | | |
|---|---|---|
| 7,100,195 B1 | 8/2006 | Underwood |
| 7,228,412 B2 | 6/2007 | Freed et al. |
| 7,406,606 B2 | 7/2008 | Chawla et al. |
| 7,441,429 B1 | 10/2008 | Nucci et al. |
| 7,519,834 B1 | 4/2009 | Dondeti et al. |
| 7,624,447 B1 | 11/2009 | Horowitz et al. |
| 7,743,415 B2 | 6/2010 | Poletto et al. |
| 8,126,722 B2 | 2/2012 | Robb et al. |
| 8,185,475 B2 | 5/2012 | Hug |
| 8,370,407 B1 | 2/2013 | Devarajan et al. |
| 8,572,733 B1 | 10/2013 | Rockwood |
| 8,832,804 B1 | 9/2014 | Casey et al. |
| 8,943,548 B2 | 1/2015 | Drokov et al. |
| 8,943,588 B1 | 1/2015 | Speegle et al. |
| 9,055,093 B2 | 6/2015 | Borders |
| 9,077,709 B1 | 7/2015 | Dall et al. |
| 9,237,021 B2 | 1/2016 | Mills et al. |
| 9,325,697 B2 | 4/2016 | Datta et al. |
| 9,438,419 B1 | 9/2016 | Aggarwal et al. |
| 9,444,916 B2 | 9/2016 | Backholm |
| 9,578,055 B1 | 2/2017 | Khanal |
| 9,589,114 B2 | 3/2017 | Strom et al. |
| 9,628,499 B1 | 4/2017 | Yu et al. |
| 9,654,485 B1 | 5/2017 | Neumann |
| 9,705,895 B1 | 7/2017 | Gutzmann |
| 9,705,902 B1 | 7/2017 | Call et al. |
| 9,800,602 B2 | 10/2017 | Shekyan et al. |
| 9,900,344 B2 | 2/2018 | Smith et al. |
| 9,967,250 B2 | 5/2018 | Johansson et al. |
| 10,169,937 B1 | 1/2019 | Zwink et al. |
| 10,574,697 B1 | 2/2020 | McClintock et al. |
| 2002/0116615 A1 | 8/2002 | Nguyen et al. |
| 2003/0042439 A1 | 3/2003 | Rusu et al. |
| 2003/0073091 A1 | 4/2003 | Krylov et al. |
| 2003/0145232 A1 | 7/2003 | Poletto et al. |
| 2003/0182447 A1 | 9/2003 | Schilling |
| 2003/0199762 A1 | 10/2003 | Fritz et al. |
| 2004/0037326 A1 | 2/2004 | D'Souza et al. |
| 2004/0103283 A1 | 5/2004 | Hornak |
| 2004/0170123 A1 | 9/2004 | Carpenter et al. |
| 2005/0027846 A1 | 2/2005 | Wolfe et al. |
| 2005/0111367 A1 | 5/2005 | Jonathan Chao et al. |
| 2005/0195840 A1 | 9/2005 | Krapp et al. |
| 2005/0198519 A1 | 9/2005 | Tamura et al. |
| 2006/0031483 A1 | 2/2006 | Lund et al. |
| 2006/0031928 A1 | 2/2006 | Conley et al. |
| 2006/0098675 A1 | 5/2006 | Okuno |
| 2006/0288411 A1 | 12/2006 | Garg et al. |
| 2007/0118894 A1 | 5/2007 | Bhatia |
| 2007/0204065 A1* | 8/2007 | Harton .................. H04L 69/08 709/246 |
| 2007/0219917 A1 | 9/2007 | Liu et al. |
| 2007/0280114 A1 | 12/2007 | Chao et al. |
| 2007/0294187 A1 | 12/2007 | Scherrer |
| 2008/0010207 A1 | 1/2008 | Yanagihara et al. |
| 2008/0028467 A1 | 1/2008 | Kommareddy et al. |
| 2008/0059797 A1 | 3/2008 | Tokuno et al. |
| 2008/0082662 A1 | 4/2008 | Dandliker et al. |
| 2008/0196099 A1 | 8/2008 | Shastri |
| 2008/0263215 A1 | 10/2008 | Schnellbaecher |
| 2008/0320567 A1 | 12/2008 | Shulman et al. |
| 2009/0052330 A1 | 2/2009 | Matsunaga et al. |
| 2009/0167520 A1 | 7/2009 | Watanabe et al. |
| 2009/0172162 A1 | 7/2009 | Wood |
| 2009/0199297 A1 | 8/2009 | Jarrett et al. |
| 2009/0241173 A1 | 9/2009 | Troyansky |
| 2009/0241174 A1 | 9/2009 | Rajan et al. |
| 2009/0265784 A1 | 10/2009 | Waizumi et al. |
| 2010/0017627 A1 | 1/2010 | Princen et al. |
| 2010/0031315 A1 | 2/2010 | Feng et al. |
| 2010/0070451 A1 | 3/2010 | Hugues |
| 2010/0070620 A1 | 3/2010 | Awadallah et al. |
| 2010/0284282 A1 | 11/2010 | Golic |
| 2010/0312875 A1 | 12/2010 | Wilerson et al. |
| 2010/0325418 A1 | 12/2010 | Kanekar |
| 2011/0012586 A1 | 1/2011 | Montanari et al. |
| 2011/0072516 A1 | 3/2011 | Cohen et al. |
| 2011/0083181 A1 | 4/2011 | Nazarov |
| 2011/0138463 A1 | 6/2011 | Kim et al. |
| 2011/0154026 A1 | 6/2011 | Edstrom et al. |
| 2011/0197177 A1 | 8/2011 | Mony |
| 2011/0264621 A1 | 10/2011 | Burjoski |
| 2011/0264905 A1 | 10/2011 | Ovsiannikov |
| 2011/0280160 A1 | 11/2011 | Yang |
| 2012/0017090 A1 | 1/2012 | Gould et al. |
| 2012/0023090 A1 | 1/2012 | Holloway et al. |
| 2012/0079592 A1 | 3/2012 | Pandrangi |
| 2012/0090030 A1 | 4/2012 | Rapaport et al. |
| 2012/0117621 A1 | 5/2012 | Kondamuru et al. |
| 2012/0144487 A1 | 6/2012 | Kim et al. |
| 2012/0167210 A1 | 6/2012 | Oro Garcia et al. |
| 2012/0173710 A1 | 7/2012 | Rodriguez |
| 2012/0203904 A1 | 8/2012 | Niemela et al. |
| 2012/0233665 A1 | 9/2012 | Ranganathan et al. |
| 2012/0254386 A1 | 10/2012 | Smith et al. |
| 2012/0323700 A1 | 12/2012 | Aleksandrovich et al. |
| 2013/0080407 A1 | 3/2013 | Levow |
| 2013/0081129 A1 | 3/2013 | Niemela |
| 2013/0276114 A1 | 10/2013 | Friedrichs et al. |
| 2014/0095865 A1 | 4/2014 | Yerra et al. |
| 2014/0157405 A1 | 6/2014 | Joll et al. |
| 2014/0181922 A1 | 6/2014 | Jakobsson |
| 2014/0230051 A1 | 8/2014 | Vallinayagam et al. |
| 2014/0289854 A1 | 9/2014 | Mahvi |
| 2014/0298419 A1 | 10/2014 | Boubez et al. |
| 2014/0317739 A1 | 10/2014 | Be'ery et al. |
| 2014/0373088 A1 | 12/2014 | Aggarwal et al. |
| 2015/0026766 A1 | 1/2015 | Holloway et al. |
| 2015/0067328 A1 | 3/2015 | Yin |
| 2015/0088662 A1 | 3/2015 | Noller et al. |
| 2015/0128236 A1 | 5/2015 | Moscicki et al. |
| 2015/0163234 A1 | 6/2015 | Tal et al. |
| 2015/0215334 A1 | 7/2015 | Bingham et al. |
| 2015/0271179 A1 | 9/2015 | Wang et al. |
| 2015/0295945 A1 | 10/2015 | Canzanese, Jr. et al. |
| 2015/0310196 A1 | 10/2015 | Turgeman et al. |
| 2015/0341379 A1 | 11/2015 | Lefebvre et al. |
| 2016/0021117 A1 | 1/2016 | Harmon et al. |
| 2016/0057140 A1 | 2/2016 | Heeter et al. |
| 2016/0080345 A1 | 3/2016 | Safruti et al. |
| 2016/0080412 A1 | 3/2016 | Smith et al. |
| 2016/0127406 A1 | 5/2016 | Smith et al. |
| 2016/0328715 A1 | 11/2016 | Gideoni et al. |
| 2016/0352774 A1 | 12/2016 | Akcin |
| 2016/0381022 A1 | 12/2016 | Jackson et al. |
| 2017/0006033 A1 | 1/2017 | Stecher et al. |
| 2017/0063923 A1 | 3/2017 | Yang et al. |
| 2017/0171231 A1 | 6/2017 | Reybok, Jr. et al. |
| 2017/0208483 A1 | 7/2017 | Chmiel et al. |
| 2017/0249306 A1 | 8/2017 | Allen et al. |
| 2017/0318053 A1 | 11/2017 | Singh et al. |
| 2018/0124110 A1 | 5/2018 | Hunt et al. |
| 2018/0124300 A1 | 5/2018 | Brook |
| 2018/0152356 A1 | 5/2018 | Dhariwal |
| 2019/0238554 A1 | 8/2019 | Disraeli |

OTHER PUBLICATIONS

"BIG-IP® Local Traffic Manager™: Concepts," Version 11.4., Publication No. MAN-0377-05, F5 Networks, Inc, pp. 1-178, Sep. 26, 2013.

"BIG-IP® Local Traffic Manager™: Implementations," Version 11.4, Publication No. MAN-0293-08, F5 Networks, Inc., pp. 1-234, Nov. 19, 2014.

"BIG-IP® Local Traffic Manager™: Monitors Reference", Version 11.4, Publication No. MAN 0470-00, F5 Networks, Inc., pp. 1-106, Nov. 26. 2013.

"Operations Guide 1.0 F5 Local Traffic Manager and Global Traffic Manager," Publication No. BIG-IP LTMGTMOps-01_0_0, F5 Networks, pp. 1-144, Dec. 12, 2014.

"Release Note: BIG-IP LTM and TMOS," Version 11.4.1, F5 Networks, Inc., pp. 1-58, Dec. 18, 2014.

(56) References Cited

OTHER PUBLICATIONS

"BIG-IP Application Security Manager Operations Guide," Publication No. BIG-IP ASMOps 01_1, F5 Networks, Inc., pp. 1-181, Jul. 2016.
"BIG-IP ASM," Version 11.5.0, Release Notes, F5 Networks, Inc., pp. 1-44, Apr. 12, 2016.
"BIG-IP ASM," Version 11.6.1, Release Notes, F5 Networks, Inc., pp. 1-18, Jun. 13, 2016.
"BIG-IP® Analytics: Implementations," Version 11.5, Publication No. MAN-0357-05, F5 Networks, Inc., pp. 1-50, Aug. 25, 2015.
"BIG-IP® Analytics: Implementations," Version 11.6, Publication No. MAN-0357-06, F5 Networks, Inc. pp 1-62, Aug. 24, 2015.
"BIG-IP® Application Security Manager™: Getting Started," Version 11.6, Publication No. MAN-0285-09, F5 Networks, Inc., pp. 1-78, Aug. 20, 2014.
"BIG-IP® Application Security Manager™: Implementations," Version 11.6, Publication No. MAN-0358-07, F5 Networks, Inc., pp. 1-420, Aug. 20, 2014.
"BIG-IP® Application Security Manager™: Implementations," Version 11.5, Publication No. MAN-0358-06, F5 Networks, Inc., pp. 1-396, Jan. 27, 2014.
"BIG-IP® Local Traffic Management: Basics," Version 11.6, Publication No. MAN-0538-00, F5 Networks, Inc., pp. 1-74, Mar. 17, 2016.
"BIG-IP® Network Firewall: Policies and Implementations," Version 11.6, Publication No. MAN-0439-04, F5 Networks, Inc., pp. 1-166, Aug. 20, 2014.
"BIG-IP® Systems: DoS Protection and Protocol Firewall Implementations," Version 11.6, Publication No. MAN-0440-03, F5 Networks, Inc., pp. 1-108, Aug. 20, 2014.
"BIG-IP® TMOS®: Concepts," Version 11.5, Publication No. MAN-0378-04, F5 Networks, Inc., pp. 1-148, May 1, 2014.
"BIG-IP® TMOS®: Implementations," Version 11.5, Publication No. MAN-0379-05, F5 Networks, Inc., pp. 1-274, Sep. 2, 2014.
"BIG-IP® DNS Services: Implementations," Version 11.5, Publication No. MAN-0446-02, F5 Networks, Inc., pp. 1-156, Jan. 27, 2014.
"BIG-IP® DNS Services: Implementations," Version 11.3, Publication No. MAN-0446-00, F5 Networks, Inc., pp. 1-76, Feb. 5, 2016.
"BIG-IP® Global Traffic Manger™: Implementations," Version 11.4, Publication No. MAN-0388-03, F5 Networks, Inc., pp. 1-106, Feb. 21, 2014.
"F5 TMOS Operations Guide," Version 12.1, F5 Networks, Inc., Publication No. BIG-IP TMOSOps-02_1, pp. 1-276, Jul. 2016.
Tegeler et al., "BotFinder: Finding Bots in Network Traffic Without Deep Packet Inspection," CoNEXT '12: Conference an Emerging Networking Experiments and Technologies, pp. 349-360. Dec. 10, 2012.
Zhang et al., "Boosting the Scalability of Botnet Detection Using Adaptive Traffic Sampling," In Proceedings of the 6th ACM Symposium on Information, Computer and Communications Security, pp. 124-134, Mar. 22, 2011.
"BIG-IP® TMOS®: Implementations," Version 12.0, Publication No. MAN-0379-09, F5 Networks, Inc., Dec. 21, 2015.
"BIG-IP® System and SafeNet® Luna SA HSM: Implementations," Version 11.6, Publication No. MAN-0496-01, F5 Networks, Inc., pp. 1-26, Oct. 21, 2016.
Rossow et al., "Sandnet: Network Traffic Analysis of Malicious Software," Proceedings of the First Workshop on Building Analysis Datasets and Gathering Experience Returns for Security, pp. 78-88, Apr. 10, 2011.
"BIG-IP ASM Operations Guide," Version 14.0, F5 Networks, Inc., pp. 1-102, Dec. 2018.
"BIG-IP® Application Security Manager™: Getting Started," Version 12.1, Publication No. MAN-0285-11, F5 Networks, Inc., pp. 1-70, Jul. 11, 2017.
"BIG-IP® Applicatin Security Manager™: Attack and Bot Signatures," Version 12.1, Publication No. MAN-0578-01, F5 Networks, Inc., pp. 1-50, Nov. 4, 2016.
"BIG-IP® Application Security Manager™: Implementations," Version 12.1, Publicaiton No. MAN-0358-09, F5 Networks, Inc., pp. 1-388, Sep. 29, 2017.
UK Search Report for Application No. GB1705857.9, Date of Search Oct. 11, 2017, 1 pp.
"BIG-IP® Application Security Manager™: Implementations," Version 13.0, Publication No. MAN-358-10, F5 Networks, Inc., pp. 1-348. Nov. 10, 2017.
"What is Passwordless?," Azure Active Directory Passwordless Sign In (Preview)—Microsoft Docs, pp. 1-5, Aug. 4, 2019.
Wang et al., "Engaging Edge Networks in Preventing and Mitigating Undesirable Network Traffic," 2007 3rd IEEE Workshop on Secure Network Protocols, 6 pp, Oct. 16, 2007.
BIG-IP® CGNAT: Implementations, Version 12.1, F5 Networks, Inc., Mar. 7, 2018, pp. 1-178.
BIG-IP® CGNAT: Implementations, Version 13.0, F5 Networks, Inc., Aug. 29, 2018, pp. 1-206.

* cited by examiner

METHODS FOR OPTIMIZING MULTIMEDIA COMMUNICATION AND DEVICES THEREOF

This application claims the benefit of U.S. Provisional Patent Application Ser. No. 62/928,049, filed Oct. 30, 2019, which is hereby incorporated by reference in its entirety.

FIELD

This technology generally relates to methods and devices for network traffic management and, more particularly, to methods for optimizing multimedia communications and devices thereof.

BACKGROUND

H.323 is an ITU Telecommunication Standardization Sector (ITU-T) recommendation that describes protocols for the provision of audio-visual (A/V) communication sessions on all network packet. Further, the H.323 protocol provides standards for equipment, computers and services for multimedia communication across packet based networks and specifies transmission protocols for real-time video, audio and data details. Accordingly, H.323 is widely used in IP based videoconferencing, Voice over Internet Protocol (VoIP) and Internet telephony where users can communicate through the Internet and make use of a variety of products that are H.323 standard compatible.

When using the H.323 protocol, a call can be initiated using one of three techniques. One of these techniques is where a caller creates a TCP connection to a recipient using an H.225 protocol call signaling technique and then creates another TCP connection using an H.245 protocol to negotiate the necessary media and media control channels. This process is relatively straightforward to execute, but requires sequential negotiation of multiple TCP connections. A second one of these techniques is more streamlined and involves use of a data associated with negotiating the necessary media and the media control channels embedded in an H.245 tunneling bit within the one TCP connection that is established to initiate the call using an H.225 protocol. A third one of these techniques involves initiating the call using the fast start technique of the H.323 protocol, where the caller and the recipient can start media connections as soon as possible thereby making the third technique also streamlined.

Unfortunately, when this type of request to initiate a call using the second or third techniques passes through a proxy device monitoring network traffic, the streamlined, but more complex steps required by these second and third techniques results in an undesirable reduction in the performance of the proxy device monitoring network traffic.

SUMMARY

A method for optimizing multimedia communications includes intercepting a request to initiate a call configured to utilize one of plurality of call initiation techniques from a first mobile device to a second mobile device. Next, it is determined when the one of the call initiation techniques in the intercepted request is in a subset of the plurality of call initiation techniques configured to integrate at least a part of media control negotiation and call establishment. One or more fields of the intercepted request is modified to disable the one of the plurality of call initiation techniques that is configured to integrate at least a part of media control negotiation and call establishment when the determination indicates the one of the plurality of call initiation techniques is in the subset. A permission is provided to the first mobile device to initiate the call with the second mobile device using a sequential call establishment and media control negotiation technique.

A non-transitory computer readable medium having stored thereon instructions for optimizing multimedia communications comprising machine executable code which when executed by at least one processor, causes the processor to perform steps including intercepting a request to initiate a call configured to utilize one of plurality of call initiation techniques from a first mobile device to a second mobile device. Next, it is determined when the one of the call initiation techniques in the intercepted request is in a subset of the plurality of call initiation techniques configured to integrate at least a part of media control negotiation and call establishment. One or more fields of the intercepted request is modified to disable the one of the plurality of call initiation techniques that is configured to integrate at least a part of media control negotiation and call establishment when the determination indicates the one of the plurality of call initiation techniques is in the subset. A permission is provided to the first mobile device to initiate the call with the second mobile device using a sequential call establishment and media control negotiation technique.

A network traffic management apparatus including at least one of configurable hardware logic configured to be capable of implementing or a processor coupled to a memory and configured to execute programmed instructions stored in the memory to intercept a request to initiate a call configured to utilize one of plurality of call initiation techniques from a first mobile device to a second mobile device. Next, it is determined when the one of the call initiation techniques in the intercepted request is in a subset of the plurality of call initiation techniques configured to integrate at least a part of media control negotiation and call establishment. One or more fields of the intercepted request is modified to disable the one of the plurality of call initiation techniques that is configured to integrate at least a part of media control negotiation and call establishment when the determination indicates the one of the plurality of call initiation techniques is in the subset. A permission is provided to the first mobile device to initiate the call with the second mobile device using a sequential call establishment and media control negotiation technique.

A network traffic management system, comprising one or more traffic management apparatuses, client devices, or server devices, the network traffic management system comprising memory comprising programmed instructions stored thereon and one or more processors configured to be capable of executing the stored programmed instructions to intercept a request to initiate a call configured to utilize one of plurality of call initiation techniques from a first mobile device to a second mobile device. Next, it is determined when the one of the call initiation techniques in the intercepted request is in a subset of the plurality of call initiation techniques configured to integrate at least a part of media control negotiation and call establishment. One or more fields of the intercepted request is modified to disable the one of the plurality of call initiation techniques that is configured to integrate at least a part of media control negotiation and call establishment when the determination indicates the one of the plurality of call initiation techniques is in the subset. A permission is provided to the first mobile device to initiate the call with the second mobile device using a sequential call establishment and media control negotiation technique.

This technology provides a number of advantages including providing a method, non-transitory computer readable medium, apparatus, and system that effectively assists with optimizing multimedia communications. By using the technique illustrated above, the disclosed technology is able to prevent tunneling of the H.245 protocol over the H.225 connection. Furthermore, the disclosed technology also prevents the requesting mobile device and the receiving mobile device from negotiating the media controls data during the first signaling message thereby preventing undesired behavior of the receiving mobile computing device and the requesting mobile computing device. Additionally, the disclosed technology also increases the runtime performance as less time is required to monitor and manager network traffic between the requesting mobile computing device and the receiving mobile computing device.

BRIEF DESCRIPTION OF THE DRAWINGS

FIG. 8 is an exemplary image illustrating a tunneling bit set to True;

Figure 10:
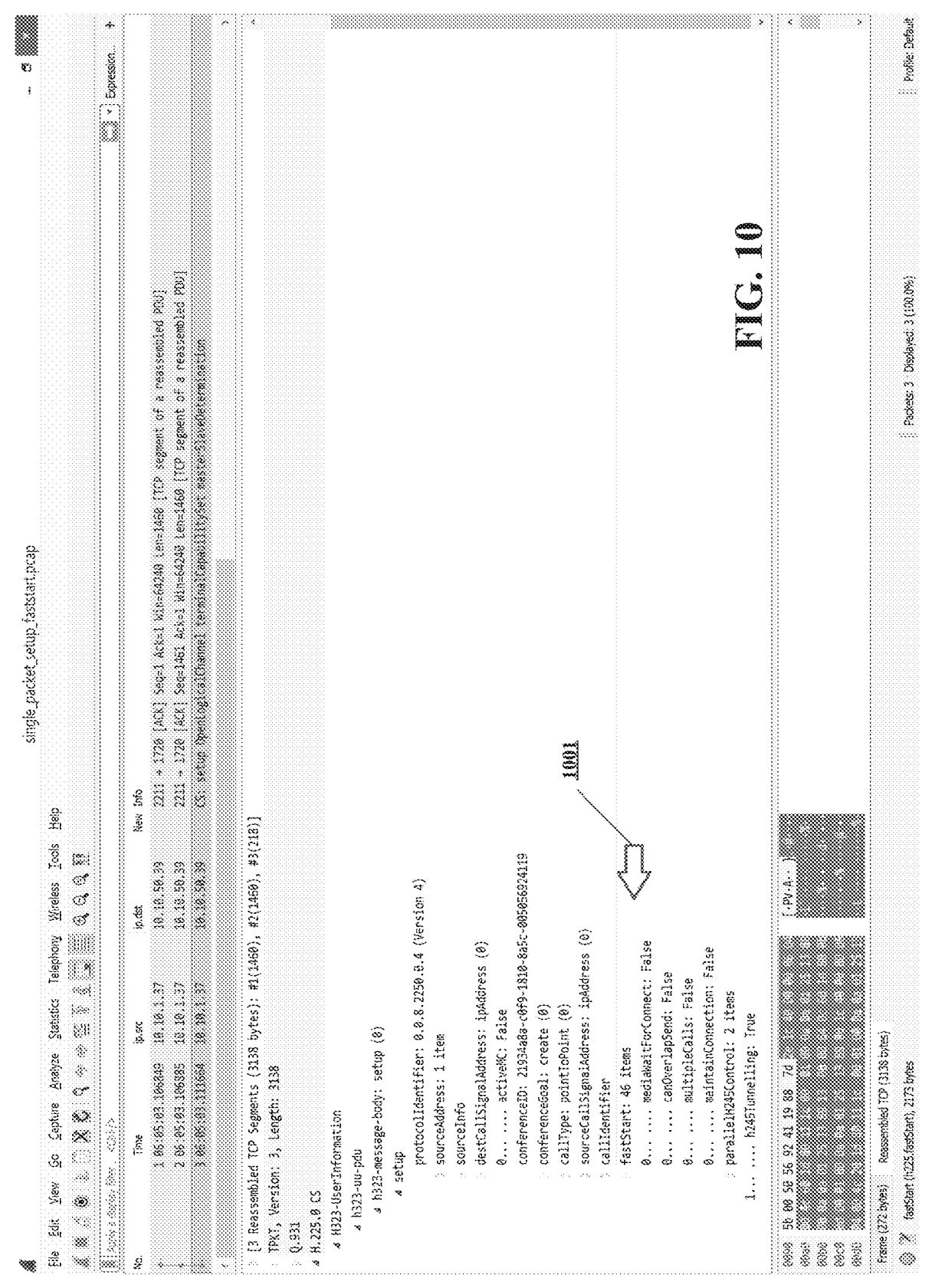

FIGS. 10-11 is an exemplary images illustrating rewriting the media and media control channel within the H.323 to prevent fast connect.

DETAILED DESCRIPTION

Figure 1:
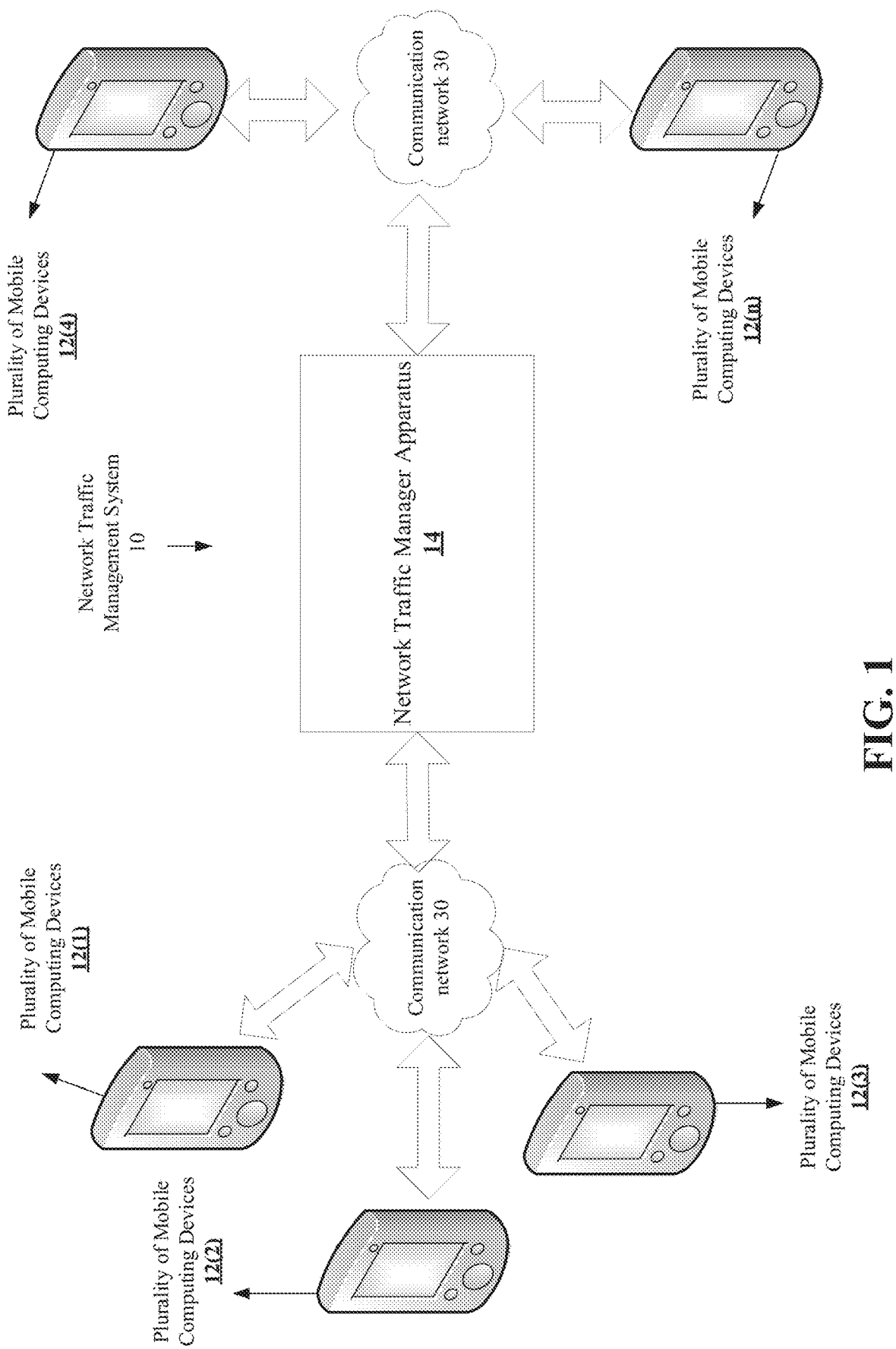
FIG. 1 is an example of a block diagram of a network traffic management system including a network traffic management apparatus for optimizing multimedia communications.
Figure 2:
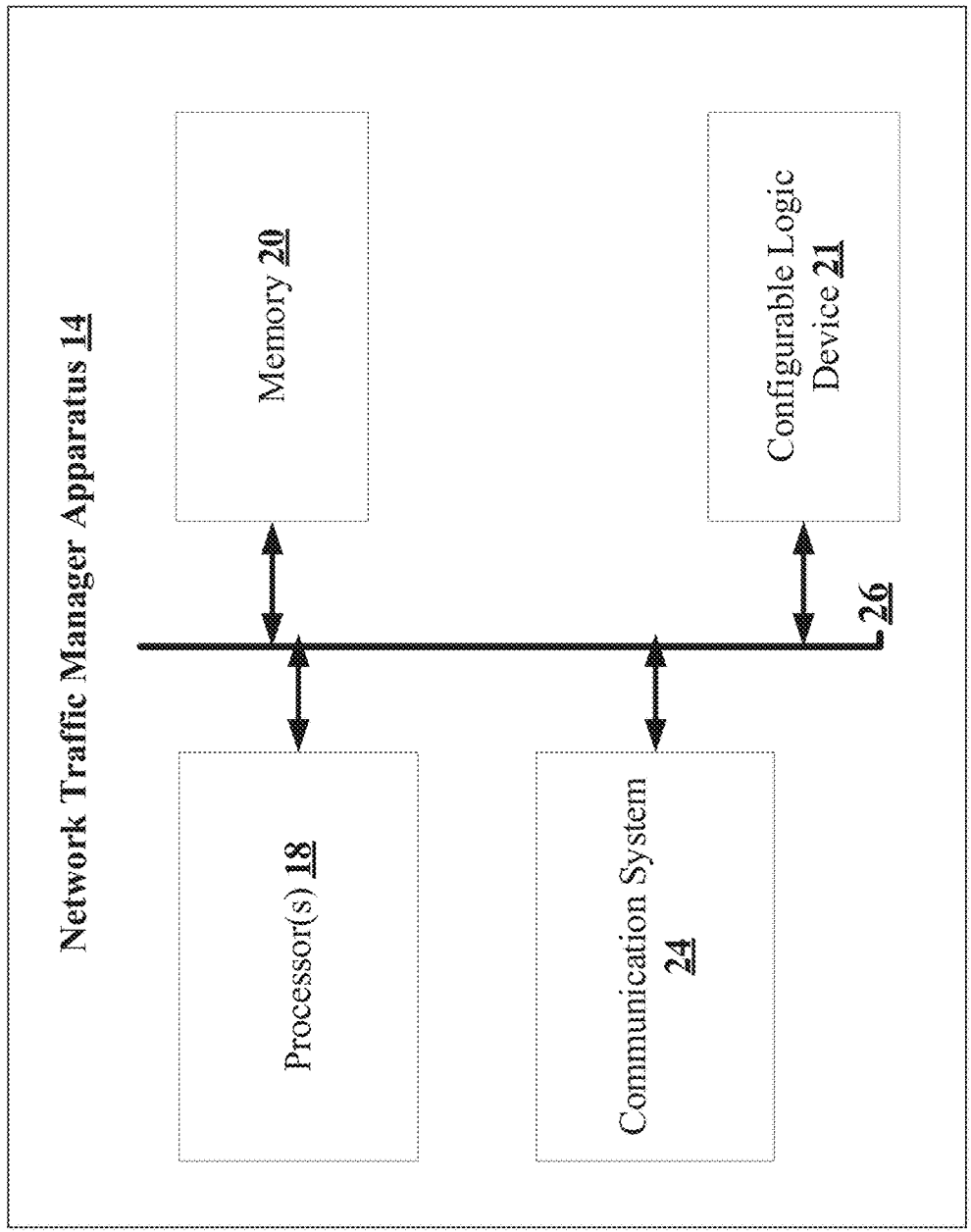
FIG. 2 is an example of a block diagram of a network traffic management apparatus.

An example of a network environment 10 which incorporates a network traffic management system for optimizing network communication using H.323 protocol with the network traffic manager apparatus 14 is illustrated in FIGS. 1 and 2. The exemplary environment 10 includes a plurality of mobile computing devices 12(1)-12(n) and a network traffic manager apparatus 14, which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including optimizing multimedia communications.

Referring more specifically to FIGS. 1 and 2, the network traffic manager apparatus 14 of the network traffic management system is coupled to the plurality of mobile computing devices 12(1)-12(n) through the communication network 30, although the plurality of mobile computing devices 12(1)-12(n) and network traffic manager apparatus 14 may be coupled together via other topologies.

The network traffic manager apparatus 14 assists with optimizing multimedia communications as illustrated and described by way of the examples herein, although the network traffic manager apparatus 14 may perform other types and/or numbers of functions. As illustrated in FIG. 2, the network traffic manager apparatus 14 includes processor or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus 26 is a PCI Express bus in this example, although other bus types and links may be used.

The processors 18 within the network traffic manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
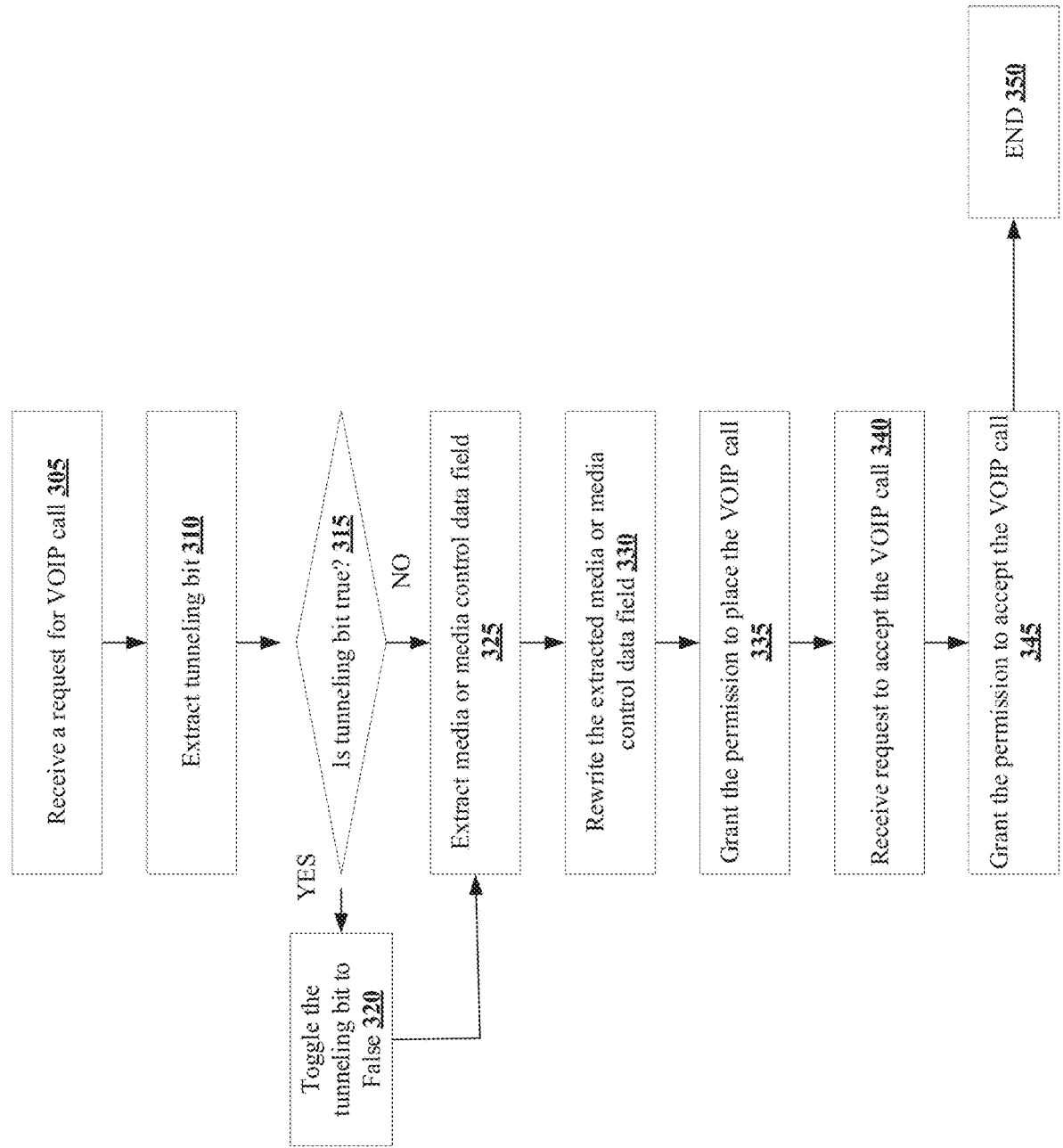
FIG. 3 is an exemplary flowchart of a method for optimizing multimedia communications.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIG. 3 is representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 3-12. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The optional configurable hardware logic device 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the network traffic manager apparatus 14 is used to operatively couple and communicate between the network traffic manager apparatus 14, the plurality of mobile computing devices 12(1)-12(n), and the plurality of servers (not shown) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of mobile computing devices 12(1)-12(n) of the network traffic management system 10, include a central processing unit (CPU) or processor, a memory, input/display device interface, configurable logic device and an input/output system or I/O system, which are coupled together by a bus or other link. The plurality of mobile computing devices 12(1)-12(n), in this example, may run interface applications, such as Web browsers, that may provide an interface to make voice over internet protocol (VOIP) calls and/or requests for and send and/or receive data to and/or from other plurality of mobile computing devices 12(1)-12(n) via the network traffic manager apparatus 14. Additionally, the plurality of mobile computing devices 12(1)-12(n) can include any type of computing device that can receive, render, and facilitate user interaction, such as client computers, network computer, mobile computers, mobile phones, virtual machines (including cloud-based computer), or the like.

While not shown, the network environment 10 can include a plurality of servers include a central processing unit (CPU) or processor, a memory, and a communication system, which are coupled together by a bus or other link, although other numbers and/or types of network devices could be used. Generally, the plurality of servers process requests for providing access to one or more enterprise web applications received from the plurality of mobile computing devices 12(1)-12(n), network traffic manager apparatus 14, via the communication network 30 according to the HTTP-based application RFC protocol or the CIFS or NFS protocol in this example, but the principles discussed herein are not limited to this example and can include other application protocols. A series of applications may run on the plurality of servers that allows the transmission of applications requested by the plurality of mobile computing devices 12(1)-12(n), or the network traffic manager apparatus 14. The plurality of servers may provide data or receive data in response to requests directed toward the respective applications on the plurality of servers from the plurality of mobile computing devices 12(1)-12(n) or the network traffic manager apparatus 14. It is to be understood that the plurality of servers may be hardware or software or may represent a system with multiple external resource servers, which may include internal or external networks. In this example the plurality of servers 16(1)-16(n) may be any version of Microsoft® IIS servers or Apache® servers, although other types of servers may be used.

Although the network traffic management apparatus 14 is illustrated as single device, one or more actions of the network traffic management apparatus 14 may be distributed across one or more distinct network computing devices. Moreover, the network traffic management apparatus 14 are not limited to a particular configuration. Thus, the network traffic management apparatus 14 may contain a plurality of network computing devices that operate using a master/slave approach, whereby one of the network computing devices of the network traffic management apparatus 14 operate to manage and/or otherwise coordinate operations of the other network computing devices. The network traffic management apparatus 14 may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the plurality of mobile computing devices 12(1)-12(n) depicted in FIG. 1 can operate within network traffic manager apparatus 14 rather than as a stand-alone server communicating with network traffic manager apparatus 14 via the communication network(s) 30.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, such as one of the plurality of servers 16(1)-16(n) or, the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of mobile computing devices 12(1)-12(n) and the network traffic manager apparatus 14, communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14 and the plurality of mobile computing devices 12(1)-12(n), for example, may be configured to operate as virtual instances on the same physical machine. In other words, one or more of network traffic manager apparatus 14, or the plurality of mobile computing devices 12(1)-12(n), illustrated in FIG. 1 may operate on the same physical device rather than as separate devices communicating through a network as depicted in FIG. 1. There may be more or fewer plurality of mobile computing devices 12(1)-12(n), or network traffic manager apparatus 14, than depicted in FIG. 1. The plurality of mobile computing devices 12(1)-12(n), could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for optimizing multimedia communications will now be described with reference to FIGS. 1-12. Referring more specifically to FIG. 3, in step 305, the network traffic manager apparatus 14 receives a request for a voice over internet protocol (VOIP) call via a SETUP message from one of the plurality of mobile computing devices 12(1)-12(n) using a H.323 protocol, although the network traffic manager apparatus 14 can receive other types communication requests from other types of devices. In this example, consistent with the H.323 protocol, the received request for the VOIP call can be via a first technique (legacy call), a second technique (H.245 tunneling bit), or a third technique (fast connect), although in other examples other numbers and/or types of techniques may be used.

Figure 4:
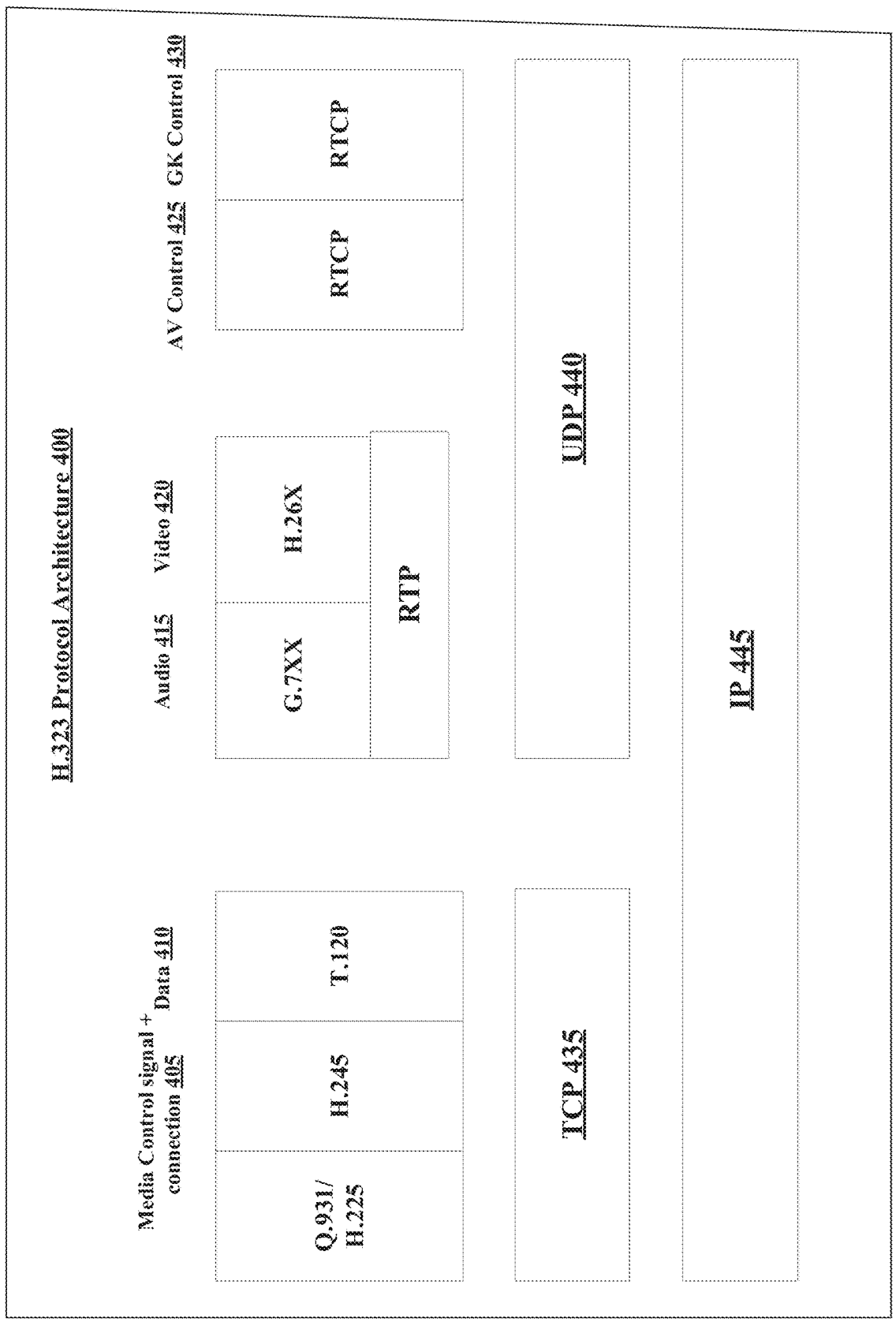
FIG. 4 is an exemplary block diagram illustrating architecture 400 of an H.323 protocol.
Figure 5:
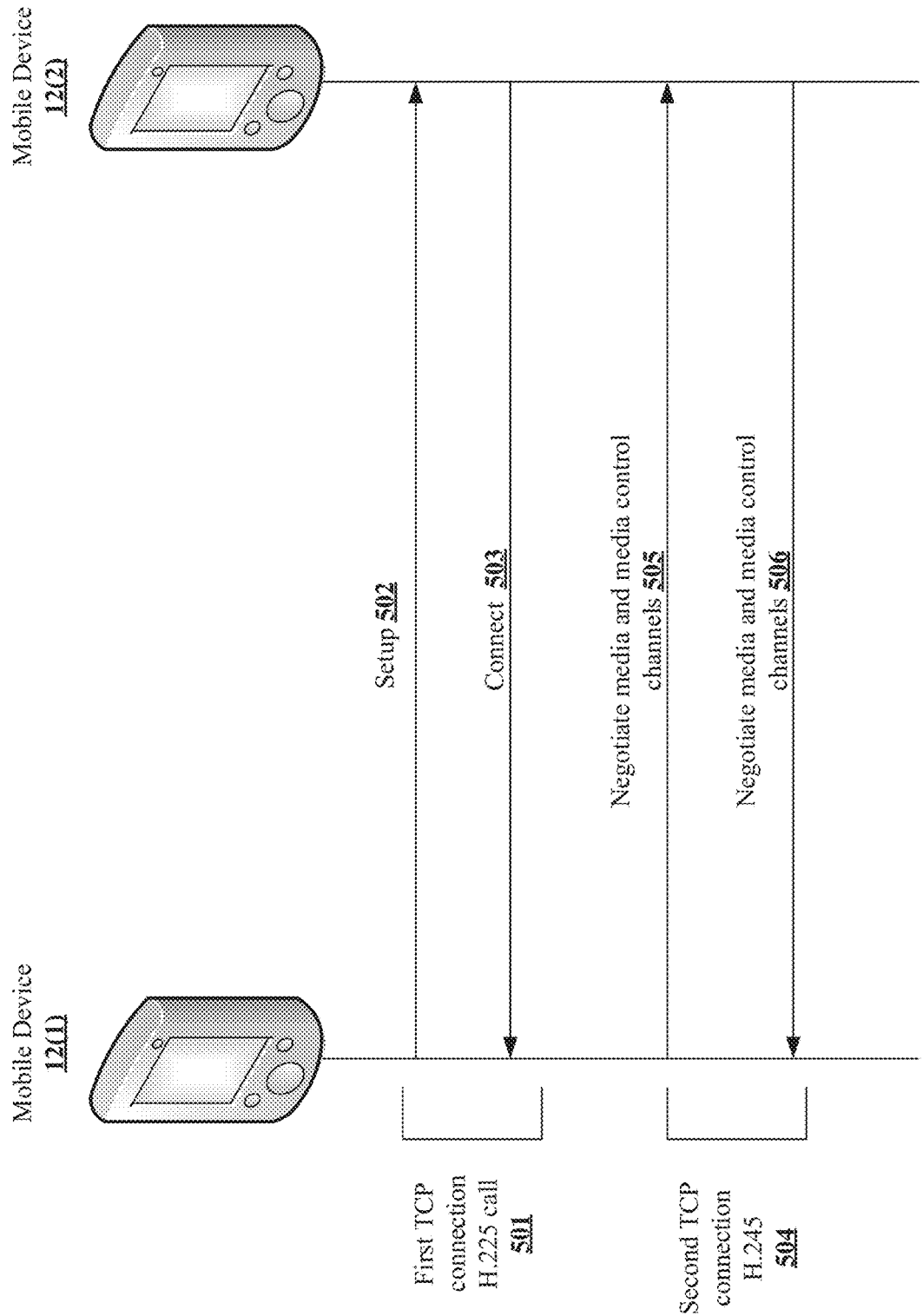
FIG. 5 is an exemplary sequence diagram illustrating use of a first call initiate technique using an H.323 protocol where a first TCP connection is established using an H.225 protocol and then a second TCP connections is established to negotiate H.245 media and media control channel using a second TCP connection in a legacy call.

To further illustrate the three call initiation techniques for the H.323. protocol, different fields in a network packet for a request to initiate a call in accordance with the H.323 protocol are illustrated in FIG. 4. In this example, a network packet in compliance with the H.323 protocol includes a media control signal connection field 405, a data field 410, an audio field 415, a video field 420, an audio/video control field 425, a gatekeeper (GK) field 430, a TCP 435, a UDP 440, and a IP 445. Additionally in this example, the media control signal connection 405 includes an H.225/Q.931 field that assists with establishing connection between two devices and an H.245 field that assists with providing capabilities, such as capability negotiation, master/slave determination (MSD), opening and closing of logical channels (i.e., audio and video flows), flow control, and conference control.

In this example, the capability negotiation provided by the H.245 field enables devices to communicate without having prior knowledge of the capabilities of the remote entity. In particular, the H.245 field assists with enabling rich multimedia capabilities, including audio, video, text, and data communication. Additionally, the H.245 field that assists with the master/slave determination (MSD) which relates to which device is the master and which is the slave as the master in a call settles all disputes between the two devices. For example, if both endpoints attempt to open incompatible media flows, it is the master who takes the action to reject the incompatible flow.

Next, once capabilities are exchanged and master/slave determination steps have completed, devices may then open logical channels or media flows. In this example, opening of logical channels or media flows is performed by sending an Open Logical Channel (OLC) message and receiving an acknowledgement message. Now, referring back to FIG. 4, the H.245 (or tunneling bit) or the fast connect bit of the media control signal connection field 405 enables a device to establish bi-directional media flows as part of the call establishment procedures. With fast connect, which will be further illustrated below using an example, it is possible to establish a call with bi-directional media flowing with no more than two messages.

Additionally as shown in FIG. 4, the data in data field 410 assists with carrying the data associated with the requested VOIP call capabilities. Next, the audio field 415 assists with carrying the audio data requested in the VOIP call supported by codecs, such as G.711, G.729, G.729a, G.723.1, and G.726, by way of example. Further, the video field 420 assists with carrying the video data related to the requested VOIP call using codecs such as H.261, H.263, and H.264, by way of example. Next, the AV control field 425 and the GK control 430 uses the real time transport control protocol (RTCP) to assists with end to end network transport function. Additionally, the TCP field 435 within the H.323 protocol architecture assists with carrying data associated with the transmission control protocol and the UDP field 440 assists with carrying data associated user datagram protocol. Finally, the IP 445 field within the H.323 protocol assists with carrying data associated with the internet protocol.

An example of the three calling techniques consistent with the H.323 protocol will now be illustrated. The first calling technique, i.e, the legacy calling technique will be illustrated with reference to FIG. 5. In a legacy call setup, first in step 501, the requesting one of the plurality of mobile devices 12(1)-12(n) creates a TCP connection to a receiving one of the plurality of mobile device 12(1)-12(n) for H.225 call signaling. After creating the TCP connection, in step 502, the requesting one of the plurality of mobile devices 12(1)-12(n) sends the receiving one of the plurality of mobile devices 12(1)-12(n) with a SETUP message. As a response, in step 503, the receiving one of the plurality of mobile devices 12(1)-12(n) sends a CONNECT message. Additionally, in this CONNECT message, the receiving one of the plurality of mobile devices 12(1)-12(n) communicates the new IP address and port for next step of H.245 connection with the requesting one of the plurality of mobile devices 12(1)-12(n).

Next, in step 504, the requesting one of the plurality of mobile devices 12(1)-12(n) creates a second TCP connection for H.245. In step 505, the requesting one of the plurality of mobile devices 12(1)-12(n) sends a message to negotiate the media and media control channels and in step 506, the receiving one of the plurality of mobile devices 12(1)-12(n) sends an acknowledgement along with the message to negotiate the media control channels back to the requesting one of the plurality of mobile devices 12(1)-12(n). After H.245 negotiation is performed, the requesting one and the receiving one of the plurality of mobile devices 12(1)-12(n) establish some media/media control channels.

Figure 6:
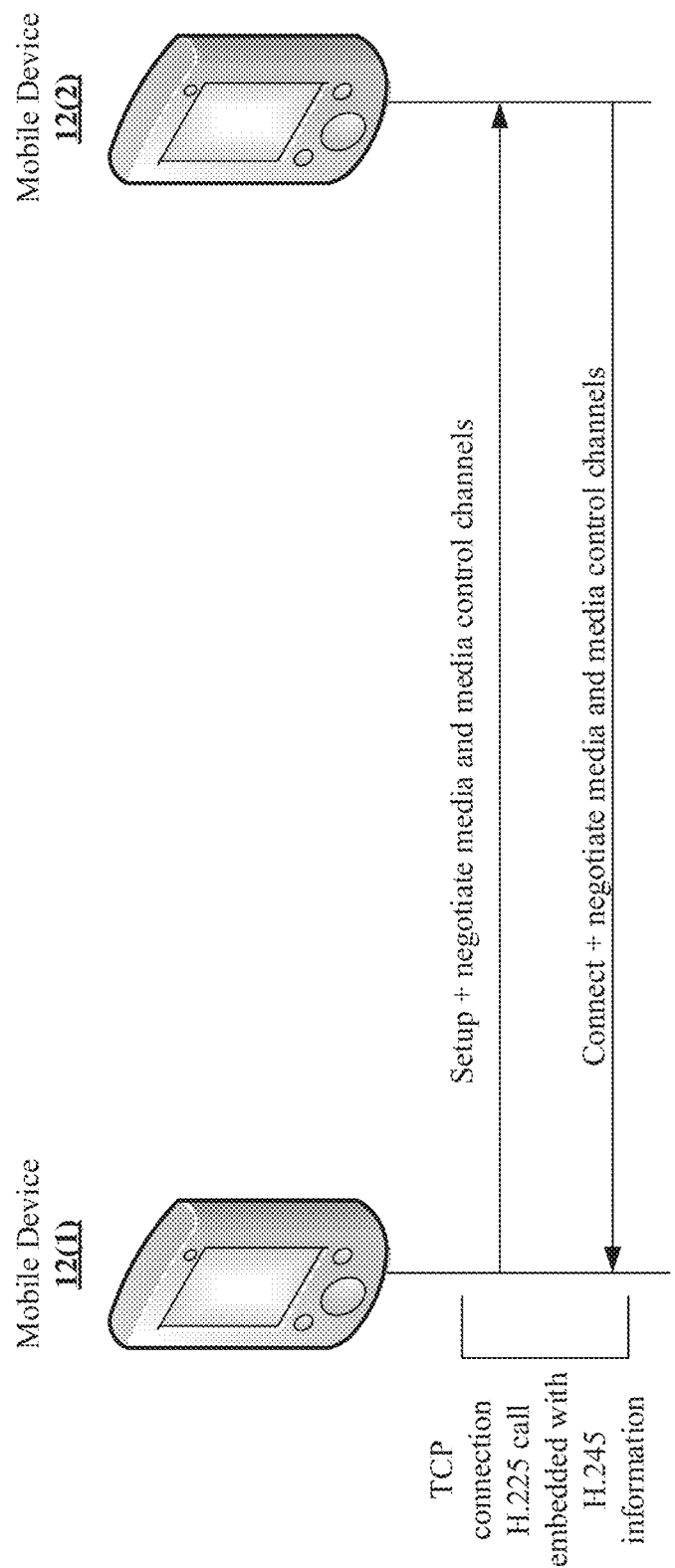
FIG. 6 is an exemplary sequence diagram illustrating a second call initiation technique that utilizes H.245 tunneling data inside a H.225 call.

Next, the second calling technique, i.e, using the tunneling bit call setup mode, will now be illustrated using FIG. 6. In the second technique, the second TCP connection for H.245 is eliminated by both the requesting one and the receiving one of the plurality of mobile devices 12(1)-12(n) by embedding H.245 information inside one protocol field of the H.225 call signaling message as illustrated in FIG. 6, by way of example.

Figure 7:
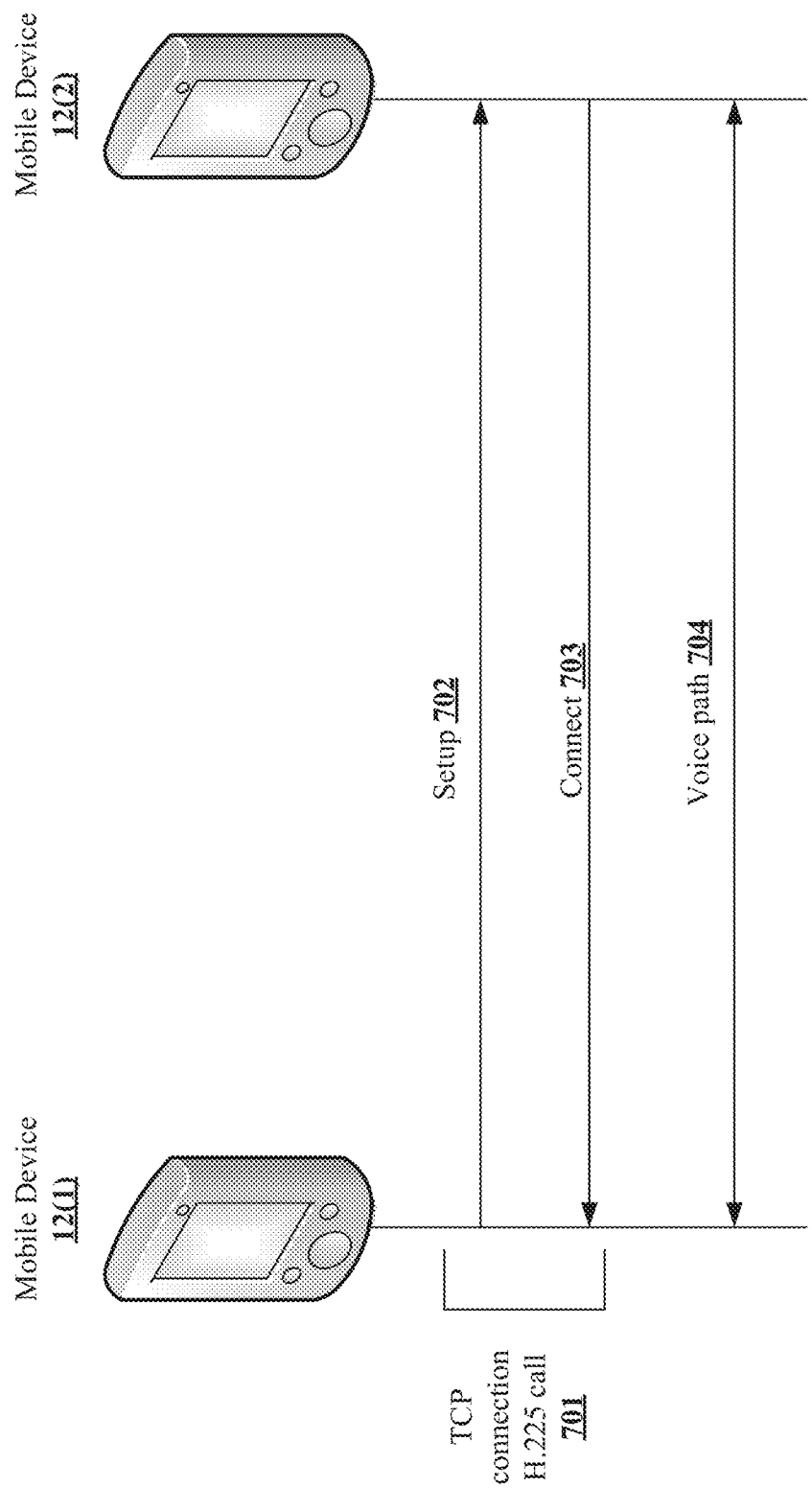
FIG. 7 is an exemplary sequence diagram illustrating use of a third call initiate technique using an H.323 protocol between two mobile devices.
Figure 9:
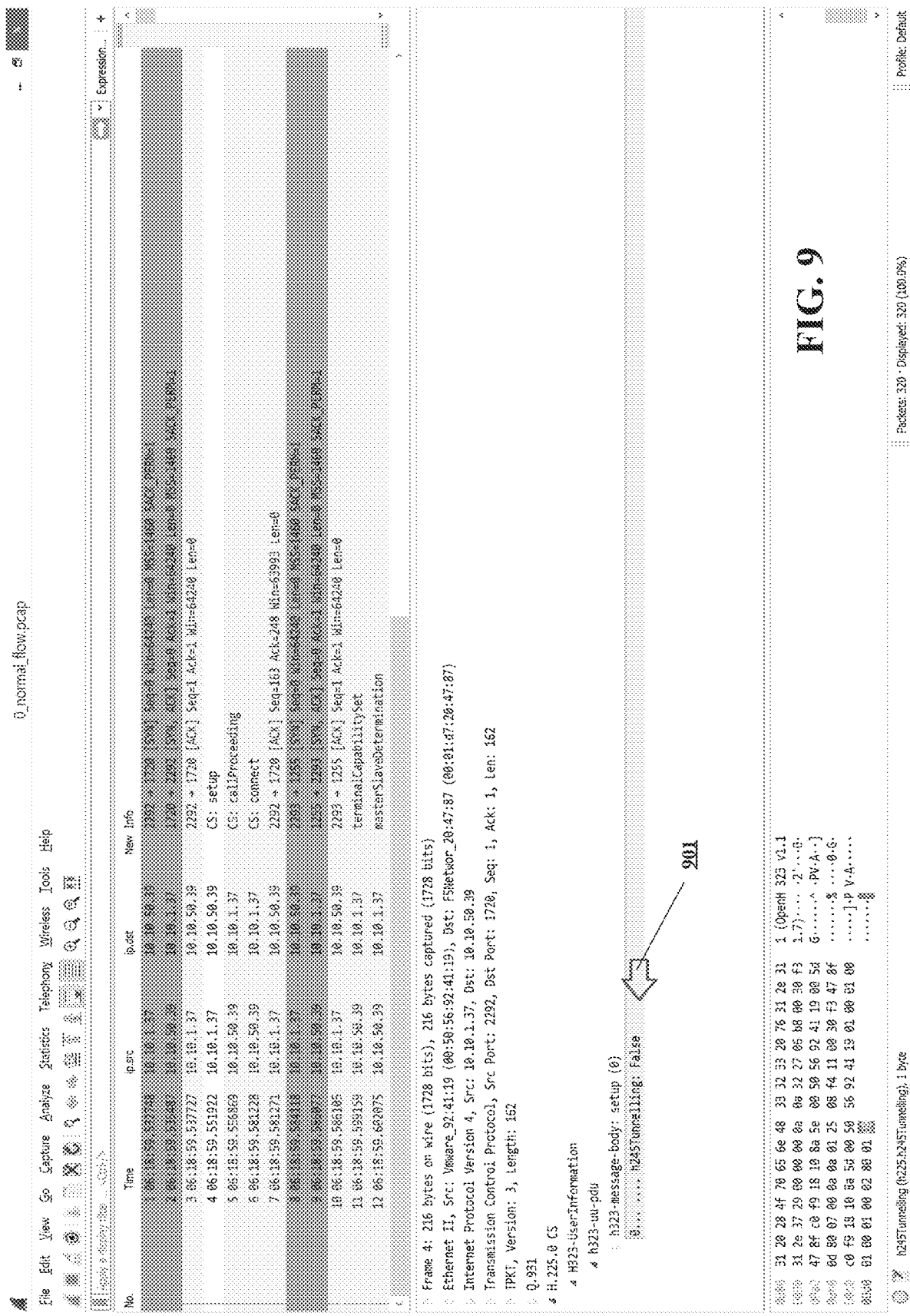
FIG. 9 is an exemplary image illustrating toggling the tunneling bit to False.

Next, the third calling technique, i.e., using fast start, will be illustrated using FIG. 7. First, in step 701, the requesting one of the plurality of mobile devices 12(1)-12(n) starts a TCP connection to initiate a H.225 call. Next within the TCP connection, in step 702, the requesting one of the plurality of mobile devices 12(1)-12(n) sends a SETUP message. As a response, in step 703, the receiving one of the plurality of mobile devices 12(1)-12(n) sends a CONNECT message. Subsequently, the audio/video is exchanged between the requesting one and the receiving one of the plurality of mobile devices 12(1)-12(n).

Referring back to FIG. 3, in step 310, the network traffic manager apparatus 14 extracts the H.245 tunneling bit from the received request consistent with the H.323 protocol to determine if the requesting one of the plurality of mobile devices 12(1)-12(n) is using the second technique, i.e tunneling bit call setup mode. As illustrated above with reference to FIG. 4, tunneling relates to plurality of mobile devices 12(1)-12(n) negotiating the media and media control channels via the H.225 call signaling message that was received in step 305.

Figure 8:
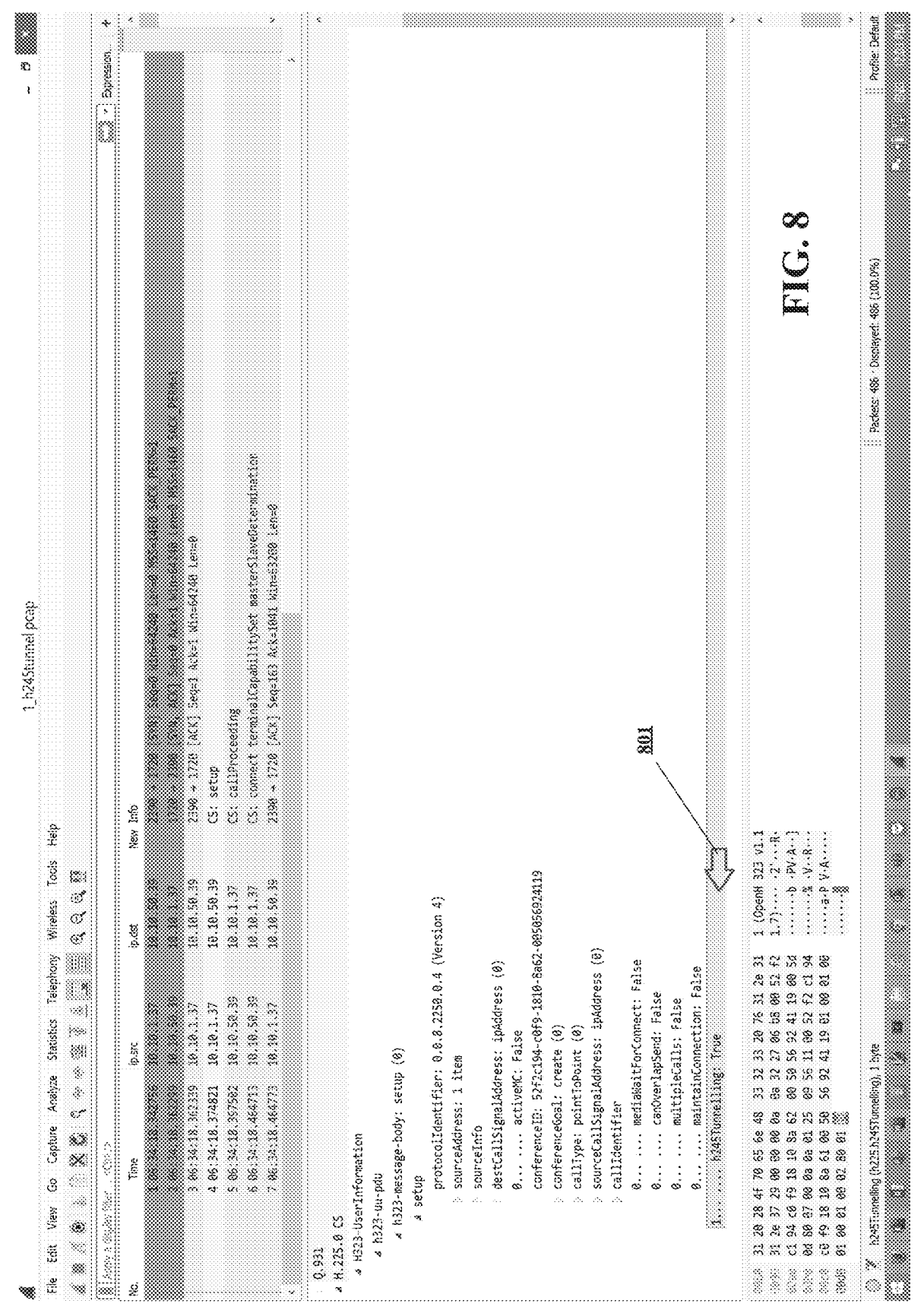

Next, in step 315, the network traffic manager apparatus 14 determines when the extracted tunnel bit is set to be true. In this example, by setting the tunneling bit to be true, the requesting one of the plurality of mobile computing devices 12(1)-12(n) indicates that the requesting one of the plurality of mobile computing devices 12(1)-12(n) intends to embed H.245 data (negotiating media and media control channels) within the H.225 call as illustrated above. An example of the extracted tunneling bit set to be true is illustrated in FIG. 8. By way of example, line 801 in FIG. 8 represents the H.245 tunneling bit set to true.

Now referring back to FIG. 3, in step 315, when the network traffic manager apparatus 14 determines that the extracted tunnel bit is not set to be True (i.e., is False), then the No branch is taken to step 325 which will be further illustrated below. However, when the network traffic manager apparatus 14 determines that the extract tunnel bit is set to be true, then the Yes branch is taken to step 320.

In step 320, the network traffic manager apparatus 14 toggles the extracted tunnel bit to false which prevents the requesting one of the plurality of mobile computing devices 12(1)-12(n) from embedding the H.245 data (negotiating media and media control channels) within the H.225 call as illustrated above. An illustration of toggling the extracted tunnel bit to false is represented in line 901 of FIG. 9, by way of example. After toggling the extracted tunneling bit to false, the exemplary flow proceeds to step 325 which will be further illustrated below.

Referring back to FIG. 3, in step 325, the network traffic manager apparatus 14 extracts the media or media control data field (fastStart data field) from the fastStart protocol data present in the received request consistent with the H.323 protocol. In this example, the media or media control data field in the received request consistent with the H.323 protocol, assists the requesting one of the plurality of mobile computing devices 12(1)-12(n) and the receiving one of the plurality of mobile computing devices 12(1)-12(n) to negotiate the media and media controls message via the first signaling message. By way of example, the media or media control data field extracted by the network traffic manager apparatus 14 is illustrated in line 1001 of FIG. 10. Alternatively, in another example, the step 325 may only be performed when data is present in the media or media control data field.

Figure 11:
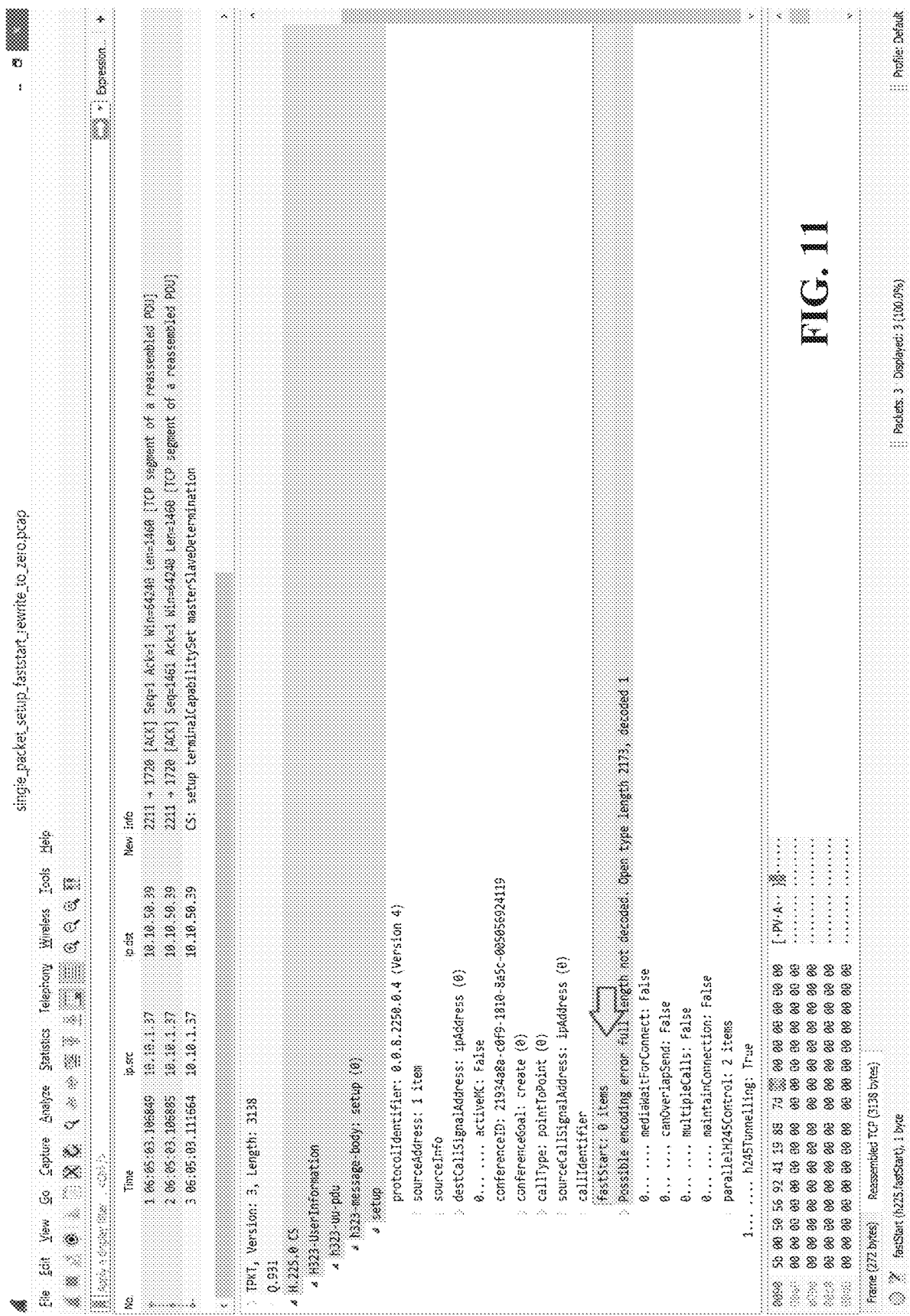

Referring back to FIG. 3, in step 330, the network traffic manager apparatus 14 rewrites the extracted media or media control data field such that the media or media control channel data in the received request would not include useful media and media control channel data without changing the length. In other words, by rewriting the media or media control channel data in the received request without changing the length, the network traffic manager apparatus 14 is able to prevent the requesting one of the plurality of mobile computing devices 12(1)-12(n) and the receiving one of the plurality of mobile computing devices 12(1)-12(n) to negotiate the media and media controls message via the first signaling message as illustrated above. By way of example, one example of rewriting the extracted media or media control data field can include rewriting the channel number to all zeros as illustrated in FIG. 11. Alternatively in another example, the extracted media or media control data field can include rewriting the channel number to 65535 (that is a number that is usually not used). In another example, the step 330 may only be performed when data is present in the media or media control data field.

In step 335, the network traffic manager apparatus 14 grants the requesting one of the plurality of mobile computing devices 12(1)-12(n) to place the call to the receiving one of the plurality of mobile computing devices 12(1)-12(n). Subsequently, the requesting one of the plurality of mobile computing devices 12(1)-12(n) attempts to establish the call with the receiving one of the plurality of mobile computing devices 12(1)-12(n).

Next in step 340, the network traffic manager apparatus 14 receives a request for permission to accept the call from the receiving one of the plurality of mobile computing devices 12(1)-12(n).

In step 345, the network traffic manager apparatus 14 grants the receiving one of the plurality of mobile computing devices 12(1)-12(n) permission to accept the call. Optionally, in another example, prior to granting the permission to accept the call, the network traffic manager apparatus 14 can perform the method illustrated in steps 310-330 (that is, toggling the tunnel bit to false and rewriting the fastStart data) on the received request for permission to accept the call before granting the receiving one of the plurality of mobile computing devices 12(1)-12(n) permission to accept the call. Subsequently, the receiving one of the plurality of mobile computing devices 12(1)-12(n) accepts the call from the requesting one of the plurality of mobile computing devices 12(1)-12(n) and indicates connection establishment to the requesting one of the plurality of mobile computing devices 12(1)-12(n). The exemplary method ends at step 350.

An exemplary method for optimizing network communication using H.323 protocol will now be explained with reference to the sequence flow diagram illustrated in FIG. 12. In step 1201, the network traffic manager apparatus 14 receives a request for a permission to call consistent with the H.323 protocol as illustrated above in step 305 of FIG. 3. Next in step 1202, the network traffic manager apparatus 14 extracts the tunnel bit from the H.245 field within the H.323 protocol as illustrated above in step 310 of FIG. 3. Further in step 1203, the network traffic manager apparatus 14 toggles the tunnel bit to false (to prevent tunneling of H.245 within the H.225) and rewrites the media and media control channel data within the H.245 (to prevent Fast connect) as illustrated in steps 320 and 330 of FIG. 3. Next in step 1204, the network traffic manager apparatus 14 grants the requesting one of the plurality of mobile devices 12(1)-12(n) permission to place the call as illustrated in step 335 of FIG. 3. In step 1205, the requesting one of the plurality of mobile devices 12(1)-12(n) attempts to establish the call with the receiving one of the plurality of mobile devices 12(1)-12(n).

Figure 12:
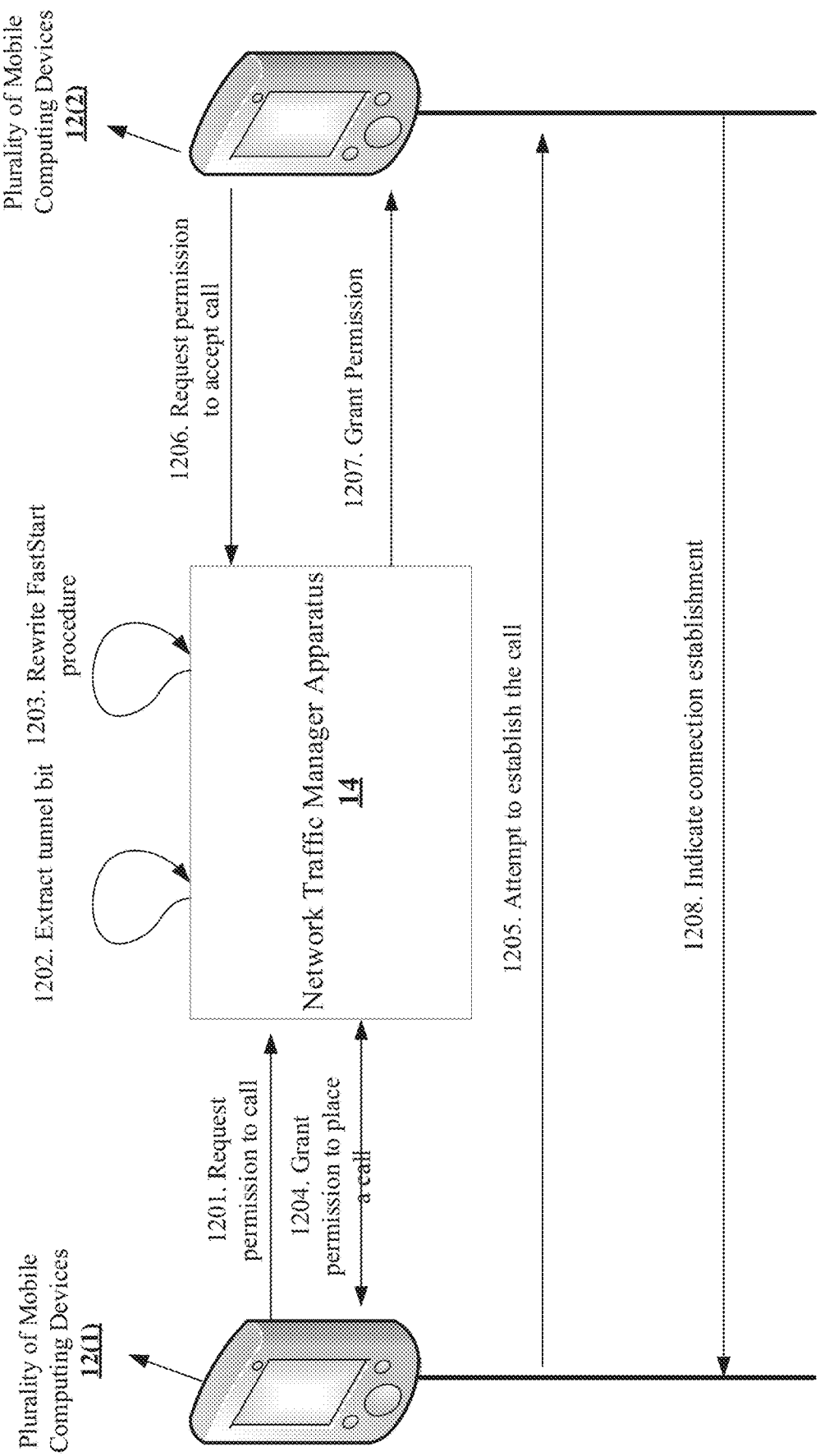
FIG. 12 is an exemplary sequence flow diagram illustrating optimizing network communication using an H.323 protocol.

Next in step 1206 of FIG. 12, the network traffic manager apparatus 14 receives a request for permission to accept the call from the receiving one of the plurality of mobile devices 12(1)-12(n) as illustrated in step 340 of FIG. 3. In step 1207, the network traffic manager apparatus 14 grants the permission to the receiving one of the plurality of mobile devices 12(1)-12(n) to accept the call as illustrated above in step 345 of FIG. 3. In this example, prior to granting the permission, the network traffic manager apparatus 14 can perform the method illustrated in steps 310-330 (that is, toggling the tunnel bit to false and rewriting the fastStart data) on the received request for permission to accept the call before granting the receiving one of the plurality of mobile computing devices 12(1)-12(n) permission to accept the call. Finally in step 1208 of FIG. 12, the receiving one of the plurality of mobile devices 12(1)-12(n) sends a message indicating establishment of the connection to the requesting one of the plurality of mobile devices 12(1)-12(n).

Accordingly, as illustrated and described by way of the examples herein, this technology provides a number of advantages including providing methods, non-transitory computer readable media and devices for optimizing multimedia communications. By using the technique illustrated above, the disclosed technology is able to prevent tunneling of the H.245 protocol over the H.225 connection. Further, the disclosed technology also prevents the requesting mobile device and the receiving mobile device from negotiating the media controls data during the first signaling message thereby preventing undesired behavior of the receiving mobile computing device and the requesting mobile computing device. Additionally, by using the above illustrated technique, the disclosed technology also increases the run-time performance as less time is required to monitor and manager network traffic between the requesting mobile computing device and the receiving mobile computing device. Furthermore, the above illustrated technology also eliminates or minimizes routines that are used to handle the tunneling and fast start negotiation thereby improving the performance of the network traffic manager apparatus.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method implemented by a network traffic management system comprising one or more network traffic apparatuses, client devices, or server devices, the method comprising:

intercepting a request to initiate a call configured to utilize one of plurality of call initiation techniques from a first mobile device to a second mobile device;

determining when the one of the call initiation techniques in the intercepted request is in a subset of the plurality of call initiation techniques configured to integrate at least a part of media control negotiation and call establishment;

modifying one or more fields of the intercepted request to disable the one of the plurality of call initiation techniques that is configured to integrate at least a part of media control negotiation and call establishment when the determination indicates the one of the plurality of call initiation techniques is in the subset; and providing the first mobile device with a permission to initiate the call with the second mobile device using a sequential call establishment and media control negotiation technique.

2. The method as set forth in claim 1 wherein the modifying further comprises:

extracting data from a tunneling field and a media control data field from the intercepted request; and modifying the extracted tunneling field and the media control data field to disable a tunneling procedure and a media control negotiation procedure to prevent the first mobile device from using the subset of the plurality of call initiation techniques.

3. The method as set forth in claim 2 wherein the modifying further comprises:

determining when the extracted data from the tunneling field includes a true identifier; and toggling the extracted data from the tunneling field to a false identifier to prevent the first mobile device from using the subset of the plurality of call initiation techniques.

4. The method as set forth in claim 2 wherein the modifying further comprises, rewriting the extracted data from the media control data field of the intercepted request to a combination of unused numeric value and zeros to prevent the first mobile device from using the subset of the plurality of call initiation techniques.

5. The method as set forth in claim 4 wherein an original length of the extracted data from the media control data field of the intercepted request is a same length after rewriting using the combination of unused numeric value and zeros.

6. A non-transitory computer readable medium having stored thereon instructions comprising executable code which when executed by one or more processors, causes the processors to:
  intercept a request to initiate a call configured to utilize one of plurality of call initiation techniques from a first mobile device to a second mobile device;
  determine when the one of the call initiation techniques in the intercepted request is in a subset of the plurality of call initiation techniques configured to integrate at least a part of media control negotiation and call establishment;
  modify one or more fields of the intercepted request to disable the one of the plurality of call initiation techniques that is configured to integrate at least a part of media control negotiation and call establishment when the determination indicates the one of the plurality of call initiation techniques is in the subset; and
  provide the first mobile device with a permission to initiate the call with the second mobile device using a sequential call establishment and media control negotiation technique.

7. The medium as set forth in claim 6 wherein the modifying further comprises:
  extracting data from a tunneling field and a media control data field from the intercepted request; and
  modifying the extracted tunneling field and the media control data field to disable a tunneling procedure and a media control negotiation procedure to prevent the first mobile device from using the subset of the plurality of call initiation techniques.

8. The medium as set forth in claim 7 wherein the modifying further comprises:
  determining when the extracted data from the tunneling field includes a true identifier; and
  toggling the extracted data from the tunneling field to a false identifier to prevent the first mobile device from using the subset of the plurality of call initiation techniques.

9. The medium as set forth in claim 7 wherein the modifying further comprises, rewriting the extracted data from the media control data field of the intercepted request to a combination of unused numeric value and zeros to prevent the first mobile device from using the subset of the plurality of call initiation techniques.

10. The medium as set forth in claim 9 wherein an original length of the extracted data from the media control data field of the intercepted request is a same length after rewriting using the combination of unused numeric value and zeros.

11. A network traffic manager apparatus, comprising memory comprising programmed instructions stored in the memory and one or more processors configured to be capable of executing the programmed instructions stored in the memory to:
  intercept a request to initiate a call configured to utilize one of plurality of call initiation techniques from a first mobile device to a second mobile device;
  determine when the one of the call initiation techniques in the intercepted request is in a subset of the plurality of call initiation techniques configured to integrate at least a part of media control negotiation and call establishment;
  modify one or more fields of the intercepted request to disable the one of the plurality of call initiation techniques that is configured to integrate at least a part of media control negotiation and call establishment when the determination indicates the one of the plurality of call initiation techniques is in the subset; and
  provide the first mobile device with a permission to initiate the call with the second mobile device using a sequential call establishment and media control negotiation technique.

12. The apparatus as set forth in claim 11 wherein the one or more processors are further configured to be capable of executing the programmed instructions stored in the memory wherein the modifying further comprises:
  extract data from a tunneling field and a media control data field from the intercepted request; and
  modify the extracted tunneling field and the media control data field to disable a tunneling procedure and a media control negotiation procedure to prevent the first mobile device from using the subset of the plurality of call initiation techniques.

13. The apparatus as set forth in claim 12 wherein the one or more processors are further configured to be capable of executing the programmed instructions stored in the memory wherein the modifying further comprises:
  determine when the extracted data from the tunneling field includes a true identifier; and
  toggle the extracted data from the tunneling field to a false identifier to prevent the first mobile device from using the subset of the plurality of call initiation techniques.

14. The apparatus as set forth in claim 12 wherein the one or more processors are further configured to be capable of executing the programmed instructions stored in the memory to rewrite the extracted data from the media control data field of the intercepted request to a combination of unused numeric value and zeros to prevent the first mobile device from using the subset of the plurality of call initiation techniques.

15. The apparatus as set forth in claim 14 wherein an original length of the extracted data from the media control data field of the intercepted request is a same length after rewriting using the combination of unused numeric value and zeros.

16. A network traffic management system, comprising one or more traffic management apparatuses, client devices, or server devices, the network traffic management system comprising memory comprising programmed instructions stored thereon and one or more processors configured to be capable of executing the stored programmed instructions to:
  intercept a request to initiate a call configured to utilize one of plurality of call initiation techniques from a first mobile device to a second mobile device;
  determine when the one of the call initiation techniques in the intercepted request is in a subset of the plurality of call initiation techniques configured to integrate at least a part of media control negotiation and call establishment;

modify one or more fields of the intercepted request to disable the one of the plurality of call initiation techniques that is configured to integrate at least a part of media control negotiation and call establishment when the determination indicates the one of the plurality of call initiation techniques is in the subset; and provide the first mobile device with a permission to initiate the call with the second mobile device using a sequential call establishment and media control negotiation technique.

17. The network traffic management system of claim 16, wherein the one or more processors are further configured to be capable of executing the programmed instructions stored in the memory wherein the modifying further comprises:

extract data from a tunneling field and a media control data field from the intercepted request; and modify the extracted tunneling field and the media control data field to disable a tunneling procedure and a media control negotiation procedure to prevent the first mobile device from using the subset of the plurality of call initiation techniques.

18. The network traffic management system of claim 17, wherein the one or more processors are further configured to be capable of executing the programmed instructions stored in the memory wherein the modifying further comprises:

determine when the extracted data from the tunneling field includes a true identifier; and toggle the extracted data from the tunneling field to a false identifier to prevent the first mobile device from using the subset of the plurality of call initiation techniques.

19. The network traffic management system of claim 16, wherein the one or more processors are further configured to be capable of executing the programmed instructions stored in the memory to rewrite the extracted data from the media control data field of the intercepted request to a combination of unused numeric value and zeros to prevent the first mobile device from using the subset of the plurality of call initiation techniques.

20. The network traffic management system of claim 19, wherein an original length of the extracted data from the media control data field of the intercepted request is a same length after rewriting using the combination of unused numeric value and zeros.

\* \* \* \* \*